(12) United States Patent
Steinbuch et al.

(10) Patent No.: US 10,495,729 B2
(45) Date of Patent: Dec. 3, 2019

(54) METHOD FOR OPERATING A RADAR DEVICE FOR A MOTOR VEHICLE

(71) Applicant: Robert Bosch GmbH, Stuttgart (DE)

(72) Inventors: Dirk Steinbuch, Wimsheim (DE); Karin Moertlbauer, Weil der Stadt (DE); Matthias Steinhauer, Steinheim (DE); Michael Ott, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 350 days.

(21) Appl. No.: 15/372,627

(22) Filed: Dec. 8, 2016

(65) Prior Publication Data

US 2017/0168138 A1    Jun. 15, 2017

(30) Foreign Application Priority Data

Dec. 10, 2015    (DE) .................. 10 2015 224 782

(51) Int. Cl.
*G01S 13/93* (2006.01)
*G01S 7/03* (2006.01)
*G01S 7/40* (2006.01)
*G01S 13/34* (2006.01)
*H04L 12/40* (2006.01)

(52) U.S. Cl.
CPC .............. *G01S 7/03* (2013.01); *G01S 7/4004* (2013.01); *G01S 13/343* (2013.01); *G01S 13/931* (2013.01); *H04L 12/40* (2013.01)

(58) Field of Classification Search
CPC ........ G01S 13/931; G01S 7/03; G01S 7/4004; H04L 12/40

USPC .......................................................... 342/195
See application file for complete search history.

(56) References Cited

U.S. PATENT DOCUMENTS

| | | | | |
|---|---|---|---|---|
| 5,659,319 A | * | 8/1997 | Rost ..................... | G01S 7/023 342/159 |
| 5,867,535 A | * | 2/1999 | Phillips ................. | G01S 1/04 375/295 |
| 2008/0046136 A1 | * | 2/2008 | Leonard ................ | G01C 23/00 701/3 |
| 2009/0303107 A1 | * | 12/2009 | Ando ..................... | G01S 3/74 342/146 |
| 2012/0226920 A1 | * | 9/2012 | Strumpf ................. | G08C 15/02 713/300 |
| 2014/0184799 A1 | * | 7/2014 | Kussel .................. | G01B 11/272 348/148 |
| 2015/0258990 A1 | * | 9/2015 | Stettner ................ | G01S 17/023 701/37 |
| 2016/0344410 A1 | * | 11/2016 | Dubey ................... | H03M 13/091 |
| 2018/0076518 A1 | * | 3/2018 | Bonebright ........... | H01Q 1/02 |

FOREIGN PATENT DOCUMENTS

WO    2013/117277 A1    8/2013

* cited by examiner

*Primary Examiner* — Timothy A Brainard
(74) *Attorney, Agent, or Firm* — Norton Rose Fulbright US LLP; Gerard Messina

(57) ABSTRACT

A method is described for operating a radar device for a motor vehicle, the method comprising the following steps:
  Providing operating data of a HF unit of the radar device;
  Transmitting the operating data of the HF unit via a digital data bus to a microcomputer unit; and
  Evaluating the operating data of the HF unit with the aid of the microcomputer unit.

22 Claims, 3 Drawing Sheets

METHOD FOR OPERATING A RADAR DEVICE FOR A MOTOR VEHICLE

FIELD OF THE INVENTION

The present invention relates to a method for operating a radar device for a motor vehicle. In addition, the present invention relates to a radar device for a motor vehicle.

BACKGROUND INFORMATION

In the further development of radar sensor systems in the automotive field, advances in semiconductor technology offer new possibilities of integration. For technological reasons, a clear separation existed in the past between a high-frequency generation and reception, on the one hand, and signal conditioning and signal processing, on the other. It has been known for approximately two generations that silicon-germanium MMICs (monolithic microwave integrated circuit) are used for high-frequency signals, and that processors, DSPs (digital signal processor), FPGAs (field-programmable gate array) and special ASICs (application-specific integrated circuit) for controlling the SiGe MMICs are realized in standard silicon technology (CMOS (complementary metal-oxide semiconductor) or mixed signal), and are therefore also implemented in different modules.

The current state of the art allows for the increasing integration of digital circuit technology in silicon-germanium high-frequency MMICs. This is made possible by the further development of the SiGe process in the direction of the BiCMOS process with SiGe semiconductor junctions. With the aid of the BiCMOS module, digital circuits can be directly integrated together with high-frequency modules, which replaces conventionally employed special ASICs for the control and evaluation of the MMICs. Subject matters of the advanced MMIC integration are essentially an integrated PLL for frequency stabilization and integrated A/D converters, which digitize the baseband signals required for the evaluation. In addition, these digital data are made available to the controller for further processing via a suitable digital interface.

Furthermore, with a view toward highly automated driving, the demands on functional safety according to ISO 26262 are growing. According to this standard, it must be ensured at all times that faults in the MMIC are identified and indicated within the shortest period of time in order to avoid incorrect reactions based on false data. As a rule, each subcomponent in a complex module must be monitored, which involves a considerable amount of time not only in carrying out the monitoring, but in particular also when polling the monitoring result. This time is then lost in the surroundings detection, which restricts the performance of a radar sensor.

In PCT Published Patent Application No. WO 2013/117277 A1, this problem was already addressed by an alarm line, which indicates monitoring that is autonomously taking place in the MMIC to the microcontroller only if a fault case has actually occurred. In such a case, additional monitoring data may be requested from the MMIC in an effort to contain the error.

SUMMARY

It is an object of the present invention to provide an improved method for operating a radar device of a motor vehicle.

According to a first aspect, the object is achieved by a method for operating a radar device for a motor vehicle, the method having the following steps:
Providing operating data of a HF-device of the radar device;
Transmitting the operating data of the HF-device via a digital data bus to a microcomputer unit; and
Evaluating the operating data of the HF-device with the aid of the microcomputer unit.

In this way the microcomputer unit is advantageously not loaded by query work with regard to operating data of the HF-device. An evaluation of the operating data supports an early detection of a system degradation of the radar device before a failure occurs in the system. This is supported in that an evaluation of the operating data is essentially carried out in real time.

According to a second aspect, the object is achieved by a radar device for a motor vehicle, having
a HF unit; and
a microcomputer unit, which is linked to the HF unit via a digital data bus;
the HF unit being designed to transmit operating data of the HF unit via the data bus to the microcomputer unit, and
the microcomputer unit being designed to carry out an evaluation of the operating data of the HF unit while the radar device is in operation.

In one advantageous further development of the method, an evaluation of the operating data is performed by comparing the operating data to permissible values of the operating data. This makes it possible to identify a tendency of the operating data with the aid of algorithms, so that timely measures may be taken to avoid system failures or system degradations.

In another advantageous further development of the method, the operating data are transmitted following a modulation sequence of baseband data. This assists in acquiring or recording the operating data in a temporally defined manner, the transmission of the operating data via the data bus taking place only afterward. This enables a detection of less time-critical operating data of the HF unit.

Another advantageous further refinement of the method is characterized by the fact that the operating data are transmitted within the modulation sequence of baseband data. This advantageously allows the method to be carried out even more efficiently because the resources are utilized more optimally. A prompt acquisition and evaluation of time-critical operating data is advantageously supported in this way.

In another advantageous further development of the method, the evaluation of the operating data is carried out over a defined period of time. This allows an even better identification of a system degradation because computational tendencies are ascertained for the operating data.

In another advantageous further development of the method, a check of a data integrity of the operating data is performed. This supports a secure data transmission, which allows suitable safety measures to be implemented, such as the generation of a CRC check sum.

The present invention will be described in detail in the following text with further features and advantages on the basis of five figures. The figures are meant to elucidate the essential principle, in particular. Identical or functionally equivalent elements have been provided with the same reference numerals.

Disclosed device features analogously result from correspondingly disclosed method features, and vice versa. This means, in particular, that features, technical advantages and embodiments pertaining to the method for operating a radar device for a motor vehicle analogously result from corresponding developments, features and advantages pertaining to the radar device for a motor vehicle, and vice versa.

DETAILED DESCRIPTION

A core idea of the present invention consists of utilizing an existing data channel for the transmission of operating data of an MMIC. This advantageously no longer makes it necessary to query a status of the MMIC at regular intervals and to create a significant computational overhead as a result. In an advantageous manner, an efficiency of a radar device for a motor vehicle is thereby increased significantly.

According to the cited document WO 2013/117277 A1, the MMIC monitors itself autonomously and reports faults to the microcontroller the moment they happen via an alarm line. However, in such a case the fault has already occurred, so that it is often too late to take countermeasures.

Therefore, it is proposed to provide relevant operating data of the MMIC on a continuous basis, so that a degradation or impermissible operating parameters such as an excessive temperature can be detected in a timely manner. This knowledge can be used to take early effective countermeasures.

In an advantageous manner, the present method allows for a rapid, efficient and secure transmission of the operating data, the data being analyzed without delay.

Rapid means within a fault tolerance period on the order of magnitude of approximately 100 ms, as defined by the ISO 26262.

Efficient means that no significant additional time burden for polling is placed on the controller.

Secure means that a data transmission is safeguarded in order to avoid faulty reactions. This is achieved with the aid of a CRC check sum, for instance.

Figure 1:
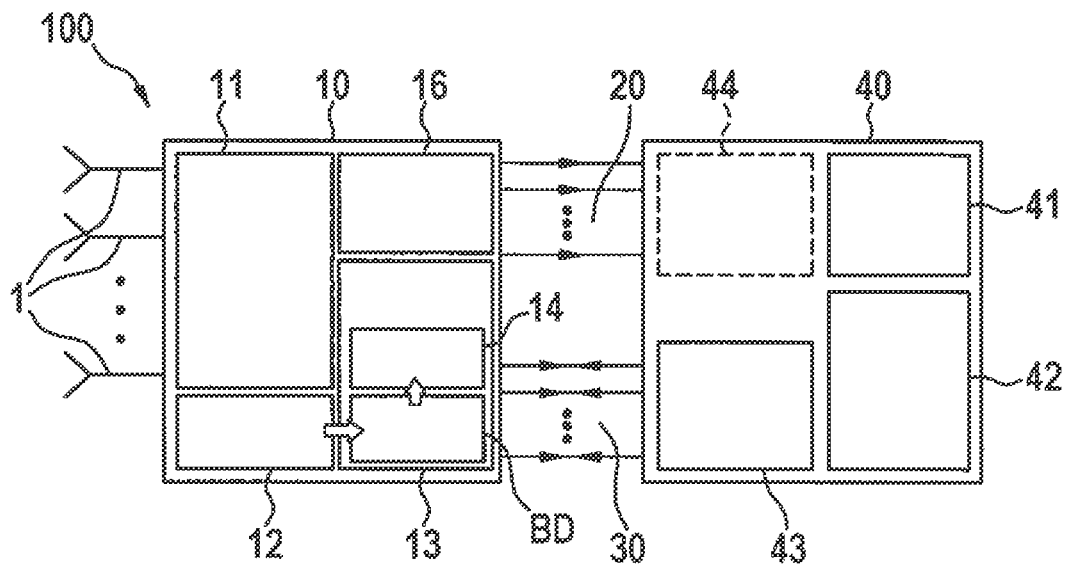
FIG. 1 a block circuit diagram of a conventional radar device for a motor vehicle.

FIG. 1 shows a considerably simplified block circuit diagram of a conventional radar device 100. Shown is a HF unit or MMIC 10, which exchanges control data with a microcomputer unit 40 (e.g., a microcontroller) via a bidirectional communications bus 30 (e.g., SPI, serial peripheral interface). Transmit and receive antennas 1 are situated at the input of HF unit 10. A HF-generation device 11 is provided for the conversion of the data received from receive antennas 1 into the baseband. In addition, microcomputer unit 40 includes a communications device 43 for the communication with HF unit 10 via communications bus 30. Furthermore, HF unit 10 has an interface in the form of a data bus 20 for the transmission of baseband data from a surroundings detection. The latter interface has an analog design, the conversion of the baseband data being carried out by a controller 13 or some other special ASIC provided for this purpose. In the future, this interface will be realized in digital form through the use of a BiCMOS.

At the end of a modulation sequence, further monitoring measurements are automatically carried out for HF unit 10. The monitoring uses recorded operating data BD, based on which a threshold comparison with limits stored internally in HF unit 10 is performed. The operating data are available in dedicated memory areas of controller 13 internal to the HF unit, to the monitoring algorithm system and also for an external call-up. Arrows between an operating-data recording unit 12 and operating data 15 and a monitoring device 14 indicate a data flow of operating data BD.

Operating data BD are transmitted to microcomputer unit 40 via the "relatively slow" bidirectional communications bus 30, i.e. a bus operated at a clock rate of approximately 20 MHz. A considerably faster unidirectional data bus 20, i.e. one operated at a clock rate of approximately 400 MHz, is used for transmitting baseband data.

From the aspect of the architecture of these interfaces, it is obvious and technically easy to provide operating-state data via communications bus 30. Polling of said operating data BD is carried out in the conventional manner, via regular queries by microcomputer unit 40 to HF unit 10 to provide the data, and in a further transmission step, to transmit the ascertained data to microcomputer unit 40. This complex communication must take place after each modulation sequence; the related high processor and interface loading is undesired because in a normal operation, operating data BD merely indicate that the operating state is satisfactory.

It is therefore proposed to transmit the required operating data via the digitally developed data bus or channel 20, which is usually set up exclusively for the transmission of the baseband data. This requires that this interface be configured in accordance with, e.g., the LVDS or the MIPI-CSI-2 specification (low voltage differential signaling, mobile industry processor interface camera serial interface 2).

At the end of modulation sequence MS, for example, the monitoring measurements for HF unit 10 follow, which store the ascertained operating data BD in the memory. A suitable device then reads out and serializes the relevant memory addresses. Via a FIFO 18, serialized operating data BD are initially buffered using the controller clock pulse in order to be subsequently provided in the clock domain of the interface to interface driver 19 via a secondary path.

In this way it is advantageously achieved that digitized baseband data BBD must be transmitted during the modulation sequence via data bus 20 anyway, this transmission not constituting overhead by itself. There is no need for triggering it first; instead, operating data BD are automatically appended to the data flow or are integrated therein. The additional time expenditure for a transmission of operating data BD is advantageously negligible due to the high bandwidth of data bus 20.

Figure 2:
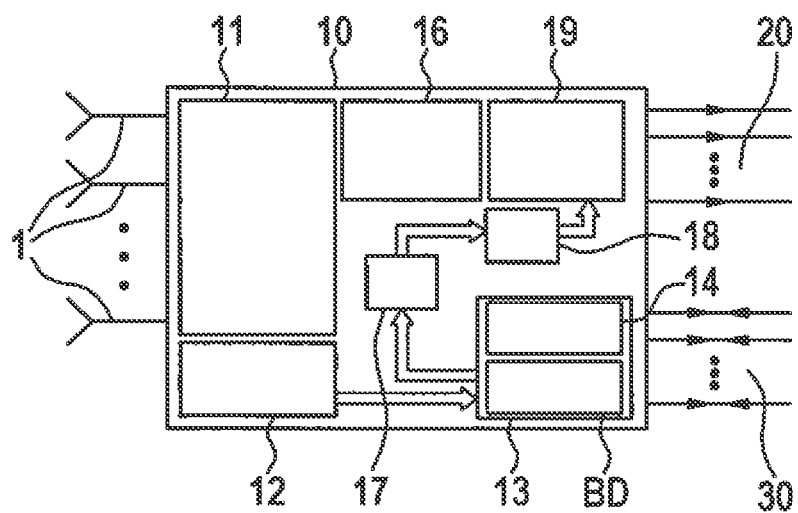
FIG. 2 a detail of a specific embodiment of a radar device for a motor vehicle according to the present invention.

FIG. 2 shows a serialization device 17, which uses FIFO 18 (first-in first-out) to route operating data BD to an interface driver 19, which then transmits the entire data via data bus 20 to a microcomputer unit 40 (not shown in FIG. 2). FIFO 18 is used in particular to make operating data BD transmittable for the different clock domains of communications bus 30 and data bus 20. If necessary, additional timer circuits (not shown) may be required to allow operating data BD to be incorporated into the data flow of data bus 20 in a suitable manner. Digital data bus 20 thereby transmits the converted baseband data during modulation sequence MS in a synchronous and direct manner.

Figure 3:
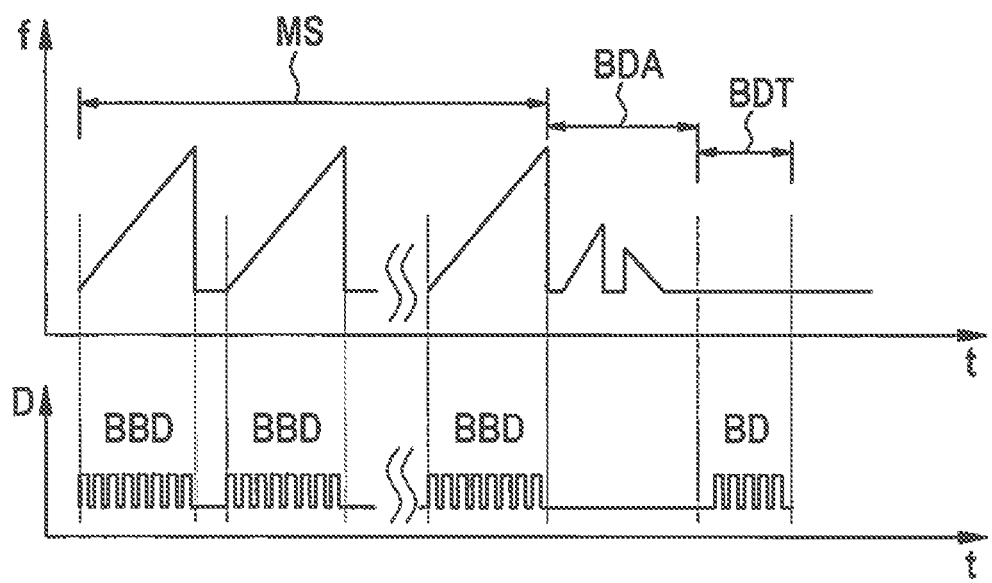
FIG. 3 a signal diagram for the transmission of the operating data according to the proposed method.

In principle, the following two options are provided for transmitting operating data BD via data bus 20:

It is clear from FIG. 3, which illustrates time characteristics of a transmit frequency f and data D, that baseband data BBD are generated in a modulation sequence MS. In a phase BDA, operating data BD of HF unit 10 are recorded, and in phase BDA, a monitoring process takes place inside HF unit 10. In a phase BDT, operating data BD are then transmitted to microcomputer unit 40.

There are a number of possibilities for handling the transmitted data in microcomputer unit 40. In a simple embodiment, microcomputer unit 40 includes the counterpart of the interface on HF unit 10 and reads the data flow directly into its memory 42 via this interface. This is followed by operating data BD at the end of modulation sequence MS, which are sequentially appended in the same memory area at the end as well. Microcomputer unit 40 then processes baseband data BBD in the memory area having a defined size. Temporally thereafter, or in parallel if multicore processors are involved, the individual operating parameters are read out of operating data BD and interpreted or evaluated through a setpoint/actual value comparison. Using slow filtering, it is advantageously possible to ascertain a trend of the operating state parameters and to correlate it with other operating state data.

Figure 4:
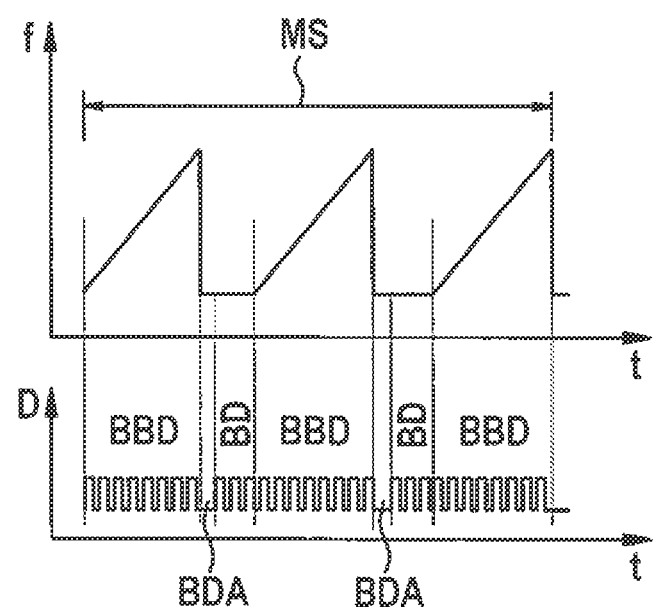
FIG. 4 a further signal diagram for the transmission of the operating data according to the proposed method.

An alternative possibility for transmitting operating data BD via data bus 20 is shown in FIG. 4 in general. In this particular case, operating-data acquisition BDA and operating-data transmission BDT are carried out within modulation sequence MS, in time slots, which may make the operating-data transmission even more efficient. For example, time-critical operating data BD or operating data BD that has to be available without fail after each individual modulation ramp are transmittable in this manner.

For instance, the following scenarios are conceivable for operating data BD:

An operating parameter "transmission power" drops inversely proportionally to a rising operating parameter "temperature": Because of the correlation between the transmission power and the temperature, the decrease in the transmission power is able to be attributed to the physical effect of the limit frequency of the semiconductor process, which drops as the temperature rises. This is interpreted to mean that no abnormal operating state is at hand.

The operating parameter "transmission power" drops steadily despite a constant temperature: Based on the characteristic, it is possible to calculate that the transmission power monitor will be triggered within minutes. Since the motor vehicle equipped with radar device 100 happens to be in a non-critical situation just then, the radar sensor with radar device 100 is switched off preventively. In this way it is prevented that the start of monitoring, and thus the deactivation of the radar sensor, takes place in a potentially critical situation.

The operating parameter "mixer conversion" continuously drops despite a constant temperature, without a drop below the monitoring threshold occurring: A true degradation over a longer period of time seems likely, so that triggering of the monitoring is expected. Prior knowledge of the degradation before monitoring is triggered allows the initiation of preventive measures, such as a reset of HF unit 10 between two modulation sequences MS or the like.

The operating parameter "temperature" rises continuously and approaches the maximally specified operating temperature: Before the maximally permitted operating temperature is reached, the pulse-no-pulse ratio of the modulation may be adapted preventively, so that the radar sensor is able to cool down as a result of the related shortened activity period of HF unit 10.

The operating parameter "receive phase tracking" indicates that the relative phase of a channel has deviated from the others and that the deviation now remains constant yet still lies within the specification: A mechanical change has lead to the phase delta. Knowledge of the phase delta may be used to correct the data of the affected channel in the signal processing. The same analogously applies to the receive-amplitude phase tracking as well as to the transmit-phase and amplitude phase tracking.

In a similar manner, many combinations of inconspicuous and conspicuous characteristics of the operating parameters exist that can partially be corrected, but that partially also require preventive measures. Correlations of operating parameters allow further inferences with regard to the causes of the change. In other cases, it can be predicted on the basis of the characteristic that monitoring will be triggered; in this case, the radar sensor can be preventively switched off in an uncritical driving situation before monitoring is suddenly triggered in a critical driving situation of the motor vehicle.

In one advantageous embodiment of radar device 100, microcomputer unit 40 includes a hardware-based preprocessing device 44 (signal processing unit, SPU) for the radar data directly downstream from the digital interface. This optionally provided preprocessing device 44 runs in synchrony with the data input on data bus 20 and depending on the implementation, runs through multiple processing stages (e.g., threshold calculation, detection, non-coherent integration, etc.) and subsequently stores the processed baseband data in memory 42 of microcomputer unit 40 for further processing. In this case, preprocessing device 44 is configured in such a way that the quantity of baseband data BBD is known and only the processing of the relevant data quantity is carried out. The following operating data BD are stored via a suitable configuration of preprocessing device 44 in dedicated memory areas of memory 42 for further processing according to the afore-described procedure. Microcomputer unit 40 is not loaded in the process, so that an especially efficient method results in an advantageous manner.

As an alternative, it is also possible that CPU 41 of microcomputer unit 40 assumes the functionality of preprocessing device 44.

Examples of time-critical operating data BD are:

Overdriving indication: Knowledge of overdriving directly following the individual ramp allows an immediate switch-back of the transmission power or the baseband amplification by microcomputer unit 40 in order to avoid complete discarding of a modulation sequence.

A/D converter level control data: Instead of indicating an overdriving incident that has already occurred, it is also possible to transmit ramps individually from control data of A/D converter 16. Analyzing the characteristic of the maximum level, microcomputer unit 40 is also able to reduce the transmit power or baseband amplification during a sequence preventively in order to avoid discarding of the entire sequence.

Interference indication: Healing measures exist for baseband data damaged by interference that can reconstruct the baseband signal in the time domain. To do so, the proposed method is advantageously employed immediately following the individual ramp. An interference-indicating item of operating data makes it possible for microcomputer unit 40 to immediately retrieve calculation algorithms for healing.

Figure 5:
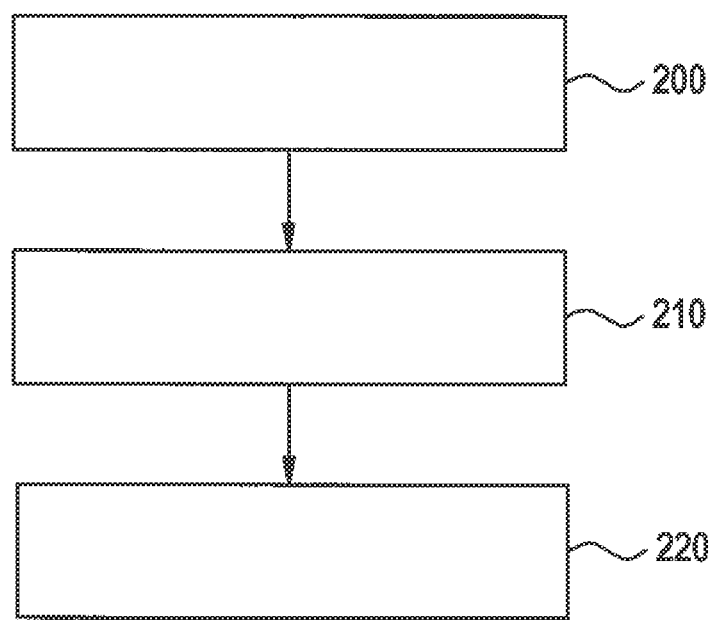
FIG. 5 a basic sequence of a specific embodiment of the method of the present invention.

FIG. 5 schematically shows a basic flow chart of one specific embodiment of the method for operating a radar device for a motor vehicle.

In a step 200, operating data of a HF unit 10 of radar device 100 is made available.

In a step 210, the operating data of HF unit 10 is transmitted via a digital data bus 20 to a microcomputer unit 40.

In a step 220, the operating data of HF unit 10 is evaluated by microcomputer unit 40.

In summary, the present invention provides an improved method for operating a radar device for a motor vehicle, by which operating data and their tendencies are able to be ascertained promptly. This advantageously increases the operational reliability of the radar device.

Although the present invention has been described in the preceding text on the basis of specific embodiments, it is by no means restricted to such. The expert will recognize that numerous undisclosed variations of the present invention are possible without departing from the core of the present invention.

What is claimed is:

1. A method for operating a radar device for a motor vehicle, comprising:
    providing operating data of a monolithic microwave integrated circuit (MIMIC) of the radar device, wherein the operating data includes: (i) an operating temperature of the MIMIC, and/or (ii) a transmission power of the MMIC, and/or (iii) an overdriving indication of the MMIC;
    transmitting, by the MIMIC on a continuous basis, the operating data of the MIMIC via a digital data bus to a microcomputer unit; and
    evaluating, by the microcomputer unit, the operating data of the MMIC;
    wherein the transmitting of the operating data of the MIMIC to the microcomputer unit is performed automatically by the MIMIC without any prompting by the microcomputer unit for the operating data of the MMIC and without the microcomputer unit retrieving the operating data from the MIMIC.

2. The method as recited in claim 1, wherein the evaluating of the operating data is carried out by comparing the operating data to permissible values of the operating data.

3. The method as recited in claim 1, wherein the operating data is transmitted following a modulation sequence of baseband data.

4. The method as recited in claim 1, wherein the operating data is transmitted within a modulation sequence of baseband data.

5. The method as recited in claim 1, wherein the evaluating of the operating data is carried out over a defined period of time.

6. The method as recited in claim 1, further comprising performing a check of a data integrity of the operating data.

7. The method as recited in claim 1, wherein the MMIC is a silicon-germanium MMIC.

8. The method as recited in claim 1, wherein the operating data includes the operating temperature of the MMIC.

9. The method as recited in claim 1, wherein the digital data bus includes an LVDS bus or an MIPI-CSI-2 bus.

10. The method as recited in claim 1, wherein the microcomputer device is external to the MIMIC.

11. The method as recited in claim 1, further comprising:
    receiving, by the MMIC, radar data from radar receive antennas;
    converting, by the MMIC, the received radar data to baseband data; and
    appending, by the MMIC, the operating data of the MIMIC to the baseband data;
    wherein the transmitting, by the MMIC, of the operating data of the MMIC via the digital data bus to the microcomputer unit includes transmitting, by the MIMIC the operating data appended to the baseband data via the digital data bus to the microcomputer unit.

12. The method as recited in claim 1, further comprising:
    receiving, by the MMIC, radar data from radar receive antennas; and
    converting, by the MMIC, the received radar data to baseband data;
    wherein the transmitting, by the MMIC, of the operating data of the MMIC via the digital data bus to the microcomputer unit includes transmitting, by the MIMIC, the operating data within a modulation sequence of the baseband data via the digital data bus to the microcomputer unit.

13. A radar device for a motor vehicle, comprising:
    a monolithic microwave integrated circuit (MMIC);
    a digital data bus; and
    a microcomputer unit connected via the digital data bus to the MMIC, wherein:
    the MIMIC transmits operating data of the MIMIC on a continuous basis via the digital data bus to the microcomputer unit, and
    the microcomputer unit evaluates the operating data of MMIC during an operation of the radar device;
    wherein the transmission of the operating data of the MIMIC to the microcomputer unit is performed automatically by the MIMIC without any prompting by the microcomputer unit for the operating data of the MMIC and without the microcomputer unit retrieving the operating data from the MMIC.

14. The radar device as recited in claim 13, further comprising:
    a serialization device; and
    a FIFO, wherein the operating data of the MMIC is able to be transmitted with the aid of the serialization device and the FIFO to an interface driver of the digital data bus.

15. The radar device as recited in claim 13, wherein the digital data bus includes an LVDS bus or an MIPI-CSI-2 bus.

16. The radar device as recited in claim 13, wherein the MMIC is a silicon-germanium MMIC.

17. The radar device as recited in claim 13, wherein the operating data includes the operating temperature of the MMIC.

18. The radar device as recited in claim 13, wherein the microcomputer device is external to the MMIC.

19. The radar device as recited in claim 13, wherein:
    the MIMIC is configured to receive radar data from radar receive antennas, to convert the received radar data to baseband data, and to append the operating data of the MIMIC to the baseband data; and
    the transmission, by the MMIC, of the operating data of the MMIC via the digital data bus to the microcomputer unit includes the MMIC transmitting the operating data appended to the baseband data via the digital data bus to the microcomputer unit.

20. The radar device as recited in claim 13, wherein:
the MIMIC is configured to receive radar data from radar receive antennas, and to convert the received radar data to baseband data; and
the transmission, by the MIMIC, of the operating data of the MMIC via the digital data bus to the microcomputer unit includes the MMIC transmitting the operating data within a modulation sequence of the baseband data via the digital data bus to the microcomputer unit.

21. A non-transitory computer-readable data carrier on which is stored program code for for operating a radar device for a motor vehicle, the program code, when executed by a computer, causing the computer to perform:
providing operating data of a monolithic microwave integrated circuit (MIMIC) of the radar device;
transmitting, by the MIMIC on a continuous basis, the operating data of the MIMIC via a digital data bus to a microcomputer unit; and
evaluating, by the microcomputer unit, the operating data of the MMIC;
wherein the transmission of the operating data of the MIMIC to the microcomputer unit is performed automatically by the MIMIC without any prompting by the microcomputer unit for the operating data of the MMIC and without the microcomputer unit retrieving the operating data from the MMIC.

22. A method for operating a radar device for a motor vehicle, comprising:
providing operating data of a monolithic microwave integrated circuit (MIMIC) of the radar device, wherein the operating data includes: (i) an operating temperature of the MIMIC, and/or (ii) a transmission power of the MMIC, and/or (iii) an overdriving indication of the MMIC;
transmitting, by the MIMIC on a continuous basis, the operating data of the MIMIC via a digital data bus to a microcomputer unit; and
evaluating, by the microcomputer unit, the operating data of the MMIC;
wherein the transmitting of the operating data of the MMIC to the microcomputer unit is performed automatically by the MIMIC without any action by the microcomputer unit.

* * * * *